United States Patent [19]

Hicks et al.

[11] 4,421,461

[45] Dec. 20, 1983

[54] WAVE-POWERED DESALINATION OF SEAWATER

[75] Inventors: Douglas C. Hicks, Newark, Del.; Charles M. Pleass, Havre de Grace, Md.

[73] Assignee: University of Delaware, Newark, Del.

[21] Appl. No.: 266,660

[22] Filed: May 26, 1981

Related U.S. Application Data

[63] Continuation-in-part of Ser. No. 76,217, Sep. 17, 1979, abandoned.

[51] Int. Cl.³ .............................................. F03B 3/12
[52] U.S. Cl. ................................. 417/53; 210/416.1; 417/331
[58] Field of Search .............. 417/330, 100, 331, 332, 417/333, 53; 60/497, 348, 504; 210/416.1

[56] References Cited

U.S. PATENT DOCUMENTS

| 3,126,830 | 3/1964 | Dilliner | 417/331 |
| 4,076,463 | 2/1978 | Welczer | 60/497 X |
| 4,204,406 | 5/1980 | Hopfe | 60/398 |
| 4,326,840 | 4/1982 | Hicks et al. | 417/331 |

Primary Examiner—Frank A. Spear, Jr.

[57] ABSTRACT

This invention provides efficient and cost effective water wave-powered piston pumps. Utility of such pumps is demonstrated in the reverse osmosis desalination of seawater.

4 Claims, 8 Drawing Figures

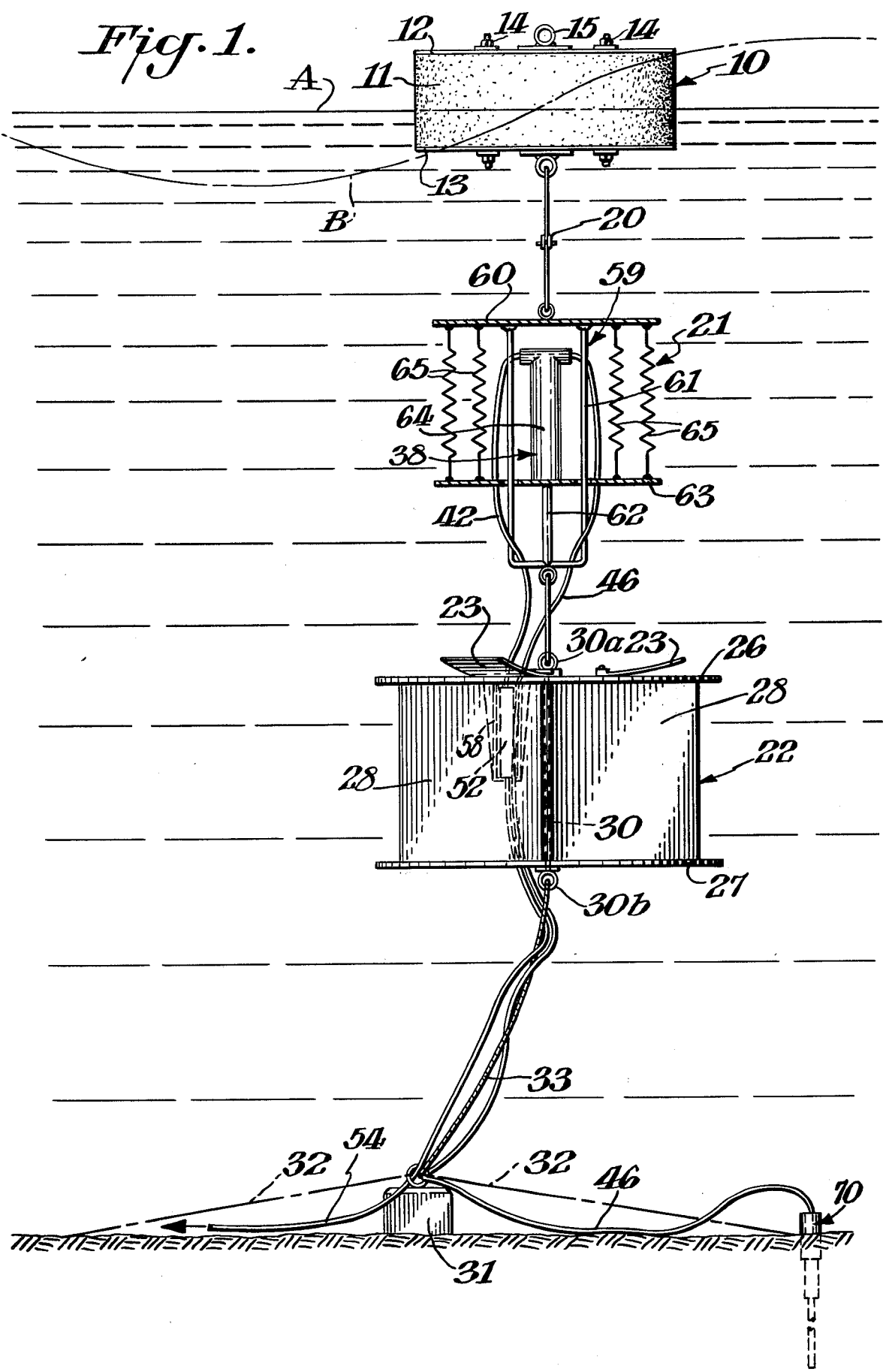

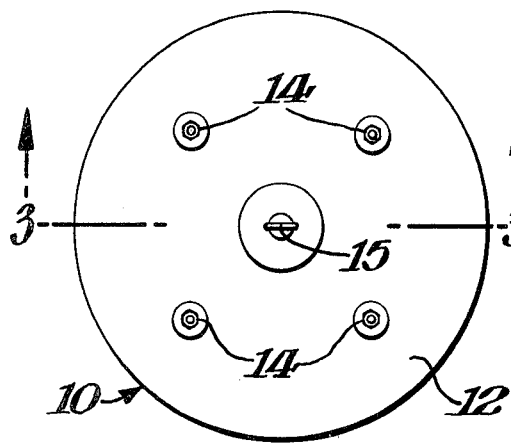
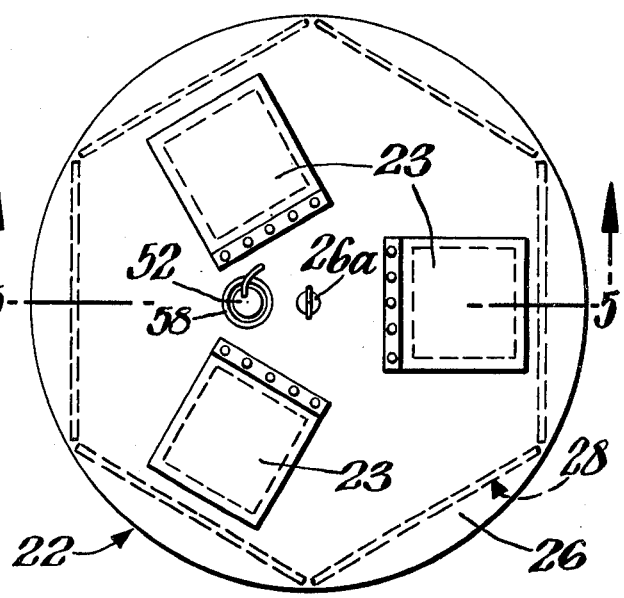
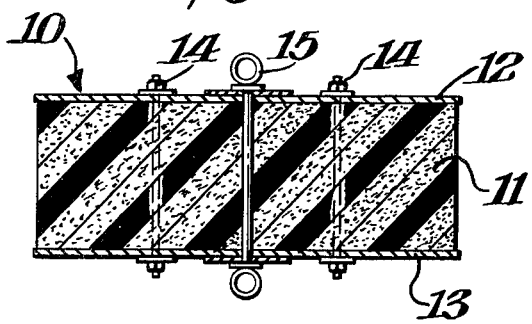
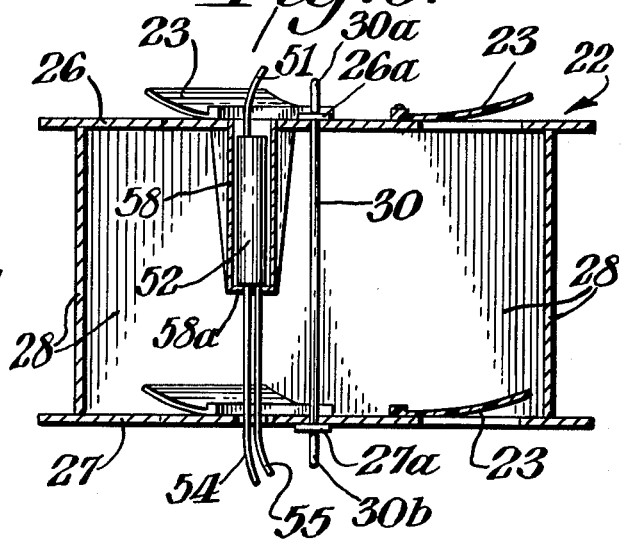

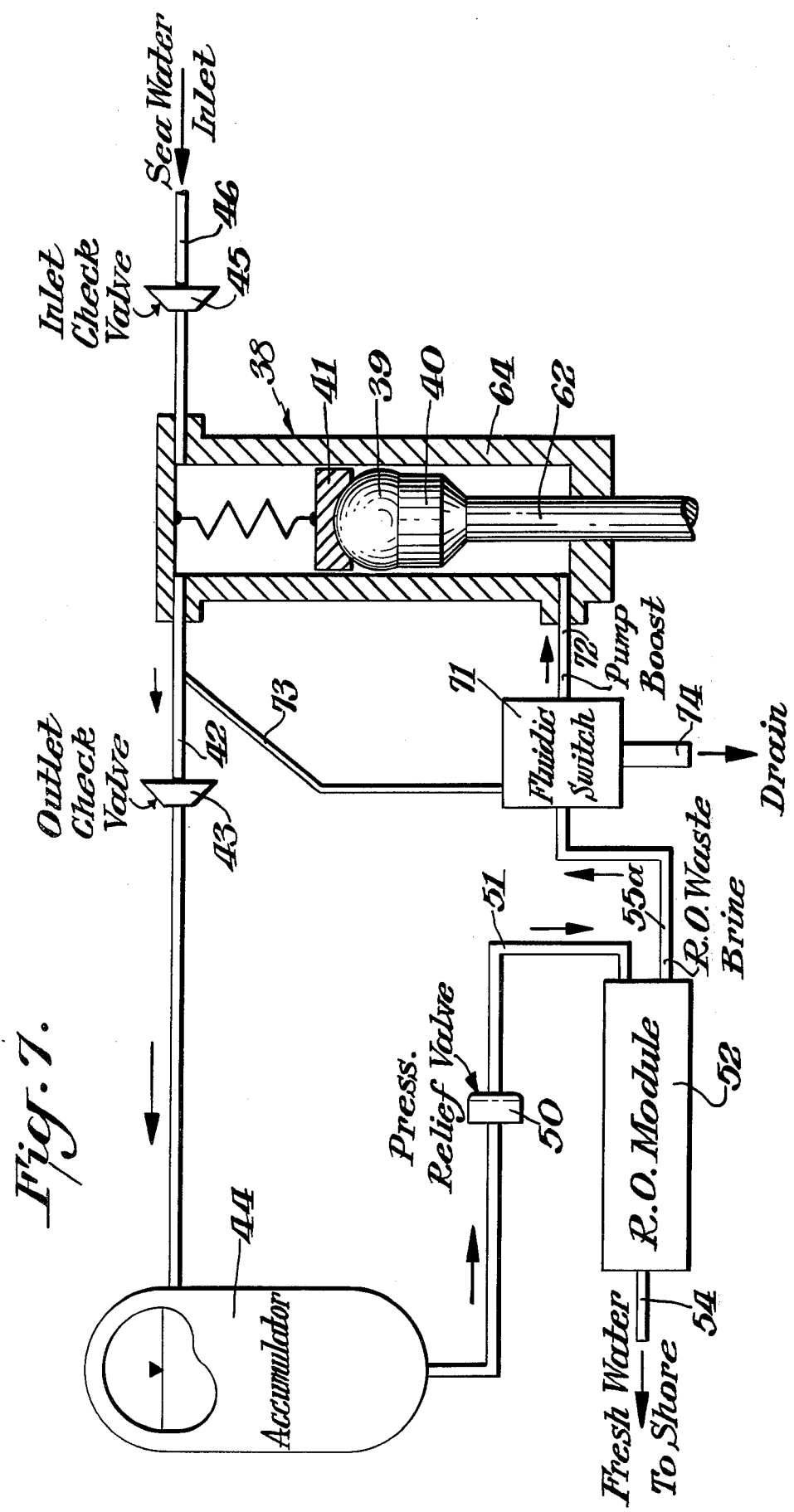

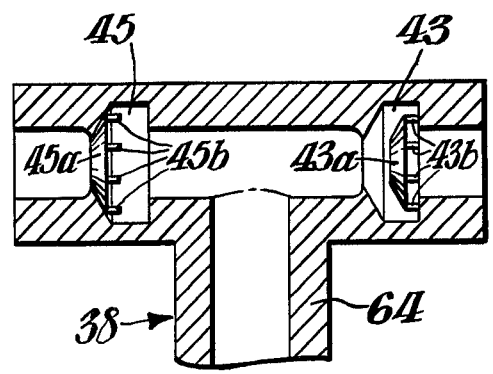
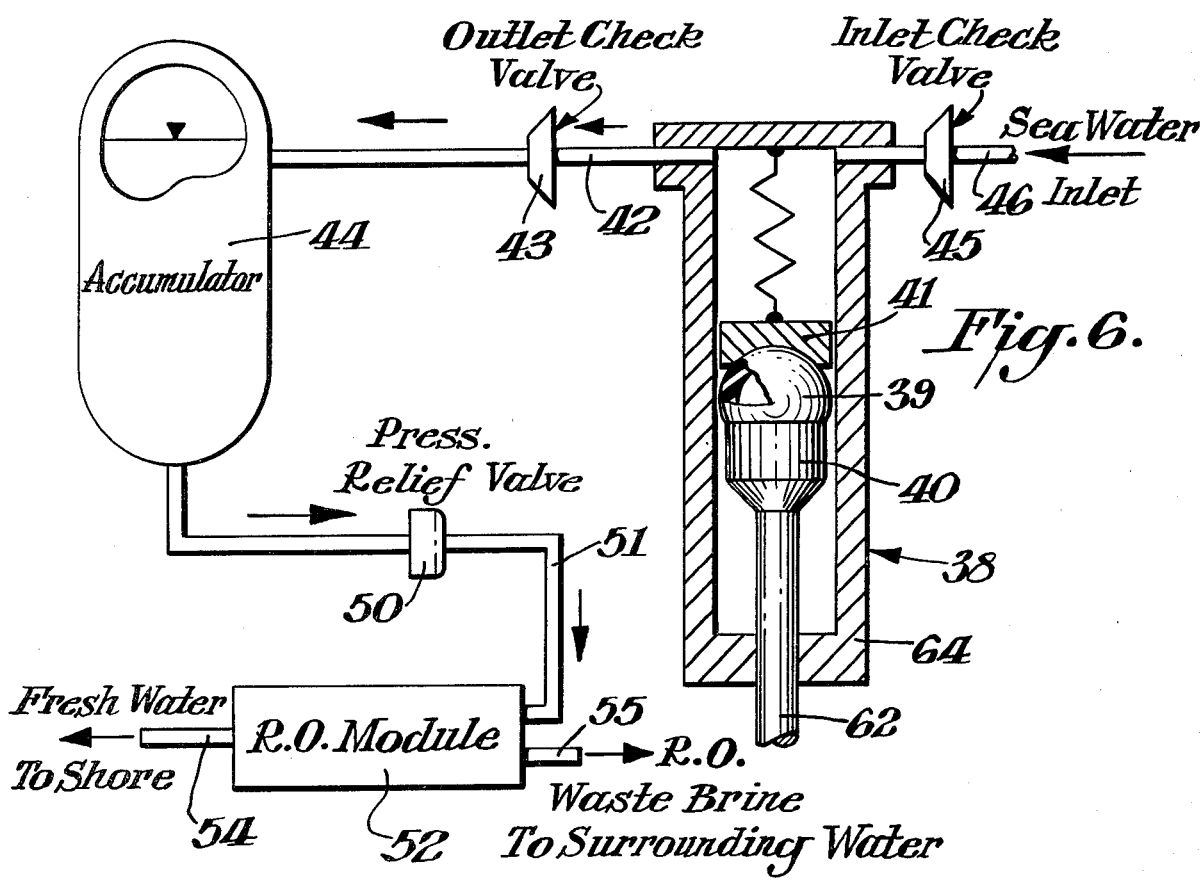

WAVE-POWERED DESALINATION OF SEAWATER

GENERAL The work culminating in this invention was performed under 1977 Sea Grant No. 4-6-158-44120 and 1978-79 Sea Grant No. 4-7-158-44120, under which the Government retains certain rights therein.

This application is a continuation-in-part of our earlier filed application Ser. No. 076,217 filed Sept. 17, 1979, now abandoned.

BACKGROUND OF THE INVENTION

Extensive regions of the world, particularly the nations denominated the Third World, lie in the path of the trade winds and are surrounded by seawater. Many of these regions lack a source of potable water and could be rendered arable and productive if irrigation water could be made available. Particular regions of note include the Horn of Africa, the Caribbean Islands and large coastal areas of Australia.

The desalination of seawater has hitherto largely depended on fossil fuels as the power source. The rising cost and increasing scarcity of fossil fuels render them substantially unavailable to poorer countries of the world. Yet the steady increase in the world population puts increasing strain on the water supplies and critically increases the need for a practical and cost effective means to desalinate seawater.

Desalination of seawater by water wave-powered reverse osmosis has not received serious attention in the past, possibly because efficient and cost effective means for providing seawater at the required pressure was not known. However, some attention has been given generally to the efficient extraction of power from waves. For example, Count in Proceedings of the Royal Society, London A, 363 559-573 (1978); IEEE Spectrum 42-49 Sept. (1979) and Evans in Journal of Fluid Mechanics 77 Part 1, 1-25 (1976) showed that the efficiency of a wave energy extraction device comprising a mooring means and a wave follower depends on the so-called natural period of the device and the power-extraction damping of the motion of the wave follower.

The natural period of the device, as the term is here used, pertains to the natural period of oscillation of the follower which, for maximum efficiency ought to match the period of the waves when in use. Among controllable variables, the natural period depends primarily on the mass of the wave follower which is kept low so as to minimize inertia. A follower is most efficient when it is non-Archimedean, i.e. is pulled underwater at least in part thus displacing somewhat more water than its own weight.

The extraction of power from the movement of the wave follower with respect to its mooring naturally causes damping which affects the efficiency of the device. The extraction of power in such a way as to maximize the power yield is an important object of this invention.

As is apparent, too much damping or constraint on the movement of the wave follower can result in no movement at all and thus no extraction of power; the classical physicist would say that although force is provided, the force does not act through a distance and hence no work is done. At the other extreme, it is apparent from similar logic, that if no constraint is applied, no power is extracted. Maximum power is extracted somewhere between these extremes.

SUMMARY OF THE INVENTION

This invention comprises a wave-powered pump which can be employed for the desalination of seawater employing reverse osmosis. It is contemplated to utilize self-contained low-cost apparatus of relatively low first cost and maintenance, which has a simple design permitting servicing by people unversed in the technical arts and which is durable and capable of withstanding the destructive effects of storms, tides and other like disturbances.

It has been found that a piston pump can be so adapted, particularly as to bore, with respect to the effective waterline plane area of the wave follower and the required pressure, to produce a device maximizing the efficiency of power extraction from waves as described above. Such a wave powered pumping device comprises:

(a) a non-Archimedean wave follower connected in sequence from top to bottom with
(b) a piston pump having a cylinder within which is mounted a reciprocatory piston;
(c) attachment means connecting one of the pair consisting of said cylinder and said reciprocatory piston with said wave follower and the other of said pair with mooring means selected from anchors, alone or in combination with a reaction unit;

wherein the ratio of the wave follower effective waterline plane area to the piston cross sectional area is within the limits of 1000 and 6500 optimally about 2000.

As to the process of using the device, one takes into account the wave height and the required pressure, normally about 800 psi, by setting the product of the effective waterline plane area and the average wave height divided by the product of the piston area and the required pressure in consistent units at between 50 and 200 optimally about 90, the stated areas being in any convenient consistent units; the wave height being in inches and the pressure in pounds per square inch.

DRAWINGS

The following drawings constituting part of the specification are partially schematic representations of a preferred embodiment of this invention, in which:

FIG. 1 is a side elevation of an apparatus comprising desalination means shown in installed position in a saltwater ocean or bay, FIG. 2 is a plan view of the wave follower of the apparatus of FIG. 1, FIG. 3 is a vertical cross-sectional view of the wave follower of FIG. 2 taken on line 3—3, FIG. 4 is a plan view of the reaction unit of the apparatus of FIG. 1, FIG. 5 is a vertical cross-sectional view of the reaction unit of FIG. 4 taken on line 5—5 comprising a reverse osmosis unit for desalination, FIG. 6 is a view, partially in cross-section, of one embodiment of water-processing system which can be employed with the apparatus of FIGS. 1-5, FIG. 7 is a view, partially in cross-section, of an especially preferred embodiment of water-processing system suitable for use with the apparatus of FIGS. 1-5, and FIG. 8 is a cross-sectional view of a preferred type of check valve which can be used in the water-processing systems of FIGS. 6 and 7.

DETAILED DESCRIPTION

The experiment, to be described, which is illustrative of many carried out in a wave tank and in the sea, shows the manner in which the ratios of piston cross sectional area to wave follower waterline plane area were arrived at so as to provide efficient piston pump coupling between a non-Archimedean wave follower and a reaction unit, arranged essentially as illustrated in FIG. 1.

The experiment, carried out in a 120'×8'×5' deep wave tank, employed a 1' diameter polystyrene foam wave follower. A 16" diameter disk 8" thick having an immersed weight of 4 lb. was employed as reaction unit. The spring constant was 3.6 lb./ft. The water depth was 35'. The wave height was 2" and the wave period was 1.4 sec. The piston cross sectional area was 0.1 in$^2$. The back pressure downstream from the pump was varied from 25 psi to 60 psi.

Efficiency as a function of back pressure was calculated as the ratio of the product of the rate of pumped water in pounds of water per unit time, and pressure expressed as feet of water head divided by the energy of the intercepted wave front (1') in foot pounds. The energy of the wave front was calculated in the conventional manner, for example, according to the U.S. Army Coastal Engineering Research Center Shore Protection Manual.

A plot of back pressure versus efficiency was bell shaped, convex upward having a maximum of 20.8% efficiency at 25.6 psi.

The scale of the equipment of this experiment is 1/15th that of a contemplated trade wind device. The experiment shows that the piston area was about twice that which, in the experimental scale, would be optimum; that an optimum piston area of about 0.05 in.$^2$ would, on 15 fold scaleup, provide a pressure of 800 psi, as is needed for reverse osmosis desalination, and up to about 10,000 gallons of pressurized water per day under trade wind conditions (2–3 ft. waves of 3–10 second period).

The ratio of the wave follower effective waterline plane area to the piston cross sectional area was 2262, near the optimum value. The effective waterline plane area is taken to be the mean waterline plane area as the waterline moves up and down during a complete pump stroke.

Particular ratios are selected according to the expected wave height and the required pressure. It will be useful to the designer to note that the product of the effective waterline plane area and the wave height divided by the product of the piston area and the required pressure, in consistent units, will lie between 50 and 200, optimally at about 90.

The further description following gives details of devices suitable for meeting the potable water needs of numbers of people. The relative simplicity of the devices and hence their cost effectiveness is apparent.

Referring to FIGS. 1–5, the power supplier of this invention comprises the wave follower denoted generally at 10, which is non-Archimedean; i.e., the wave follower is pulled down into the water so that the mass of water displaced by said wave follower is greater than the mass of wave follower 10.

In the example herein described, the wave follower 10 is pulled down into the water approximately two feet. The objective is to have the wave follower respond to the buoyant force exerted by a wave crest, as well as the wave-induced hydrodynamic drag and inertia forces imposed on the wave follower's immersed portion. However, wave follower 10 should be light enough so that it can keep up with most waves.

Although our apparatus is not highly frequency-dependent, it is advantageous that its natural period lie in the range of wave periods in which it will be operating. For the trade wind situation, the period range is from about 3 to 10 seconds.

A preferred design of wave follower 10 utilizes a 15' diameter×5' long vertical cylinder weighing no more than about 8,000 lbs. Generally, the size of the wave follower will be determined by the average wave energy flux at the deployment site and the piston cross sectional area as described above. In practice mooring buoys might be used.

The design of wave follower detailed comprises a mass of polyurethane foam 11 sandwiched between upper steel plate 12 and lower steel plate 13 and held together by stay bolts 14 and axially disposed eye bolt 15.

Wave follower 10 is tethered to the remaining apparatus by sacrificial link 20, which is designed to part under the stress of extreme storms, tidal waves or similar abnormal wave conditions, thereby permitting the major part of the system to drop safety to the sea floor, from which it can be easily recovered later, whereas the wave follower is set adrift as a highly visible floating object which can be recovered fortuitously wherever found.

Description of the seawater pump assembly 21 and appurtenances is deferred until later, so that the remainder of the wave dynamic system can be now detailed.

The non-buoyant hydrodynamic reaction unit 22 can be a highly useful component of the invention having, as primary functions, the capability of permitting operation in areas with significant tidal ranges and reduction of the mooring strains. It also acts as a buffer during storm conditions. The efficiency of devices employing reaction units is about the same as those employing simple anchor mooring means.

Reaction unit 22 should preferably have an effective mass at least equivalent to about 10 times the mass of the water displaced by the wave follower.

As detailed in FIGS. 1, 4 and 5, reaction unit 22 can be constructed as a hollow steel casing comprising top and bottom plates 26 and 27, respectively, joined through welding by hexagonal shell 28. Typically, the immersed weight can be 4,000 to 12,000 lbs., diameter at least 20 ft. and height 10 ft. provided that flow retarders 23 are incorporated. Weight distribution should, of course, be such that unit 22 aligns itself vertically with wave follower 10 when the latter is at rest.

Flow retarders 23, which are simply upwardly deflected tabs opening into shell 28, brake the upward movement of reaction unit 22, so that the rise time of the reaction unit is longer than its fall time. This ensures that the system remains under tension even when it is subjected to high frequency waves. An alternative design for reaction unit 22 is to streamline it so as to decrease its fall time relative to its rise time.

In both cases, the limit of fall of reaction unit 22 will be determined by the real mass, which is supported on elastomeric return springs 65 (FIG. 1).

Axial tie rod 30, provided with connection eyes 30a and 30b at top and bottom ends, locked to plates 26 and 27 by flanges 26a and 27a, respectively, and flexible tether 33 constitute the coupling means between seawater pump assembly 21 and ballast block 31. A threepoint mooring 32 made up of steel chains 100 ft. long running to individual anchors, not shown, coming together at the ballast block 31 provides a satisfactory arrangement, with a single line 33 running to reaction unit 22. In calm conditions, line 33 will be slack. Mooring configurations can, of course, vary widely, depending on local bottom sediment and wave and current conditions.

Returning now to the seawater pump assembly 21 and appurtenances, reference is made especially to FIGS. 1, 5, 6, 7 and 8.

The single-acting pump, generally denoted at 38, FIGS. 1, 6 and 7 can comprise the loose-fitting reciprocatory piston design which is the subject of Application Ser. No. 044,540, now U.S. Pat. No. 4,221,550. This pump embodies a polymeric ball 39 fabricated from Adiprene ® or similar elastomeric material which is supported in a concavity machined in the upper face of piston 40 and retained therein by compression spring-biased lock member 41. On the piston upstroke, polymeric ball 39 is compressed between the piston face and the lock member, and its diameter in a plane at right angles to the pump axis increases to effectively seal against water leakage past piston assembly 39, 40, 41, thereby delivering seawater under high pressure out through delivery line 42, thence, through check valve 43 to accumulator 44.

Conversely, on the piston 40 downstroke, check valve 43 closes and check valve 45, connected in series with intake line 46, opens, filling the pump with seawater for the next following pumping stroke.

Referring to FIG. 8, check valves 43 and 45 preferably have frusto-conical seats on the valve closure ends accommodating freely slidable mating frusto-conical valving members 43a and 45a, respectively. These are each provided with short foot members 43b and 45b on their reverse sides, impinging on the annular seats machined on the valve open ends of the valve housings.

The choice of piston pump is not critical and other such pumps, for example, those disclosed in the above-cited patent, are satisfactory.

In a simple piping circuit for desalination (shown in FIG. 6), raw seawater passes from accumulator 44 (not shown in FIG. 1) via pressure relief valve 50, which produces flow at pressures about 800 lbs./sq. in. via tubing 51 to the high pressure side of reverse osmosis module 52, which can be a commercially available unit such as that marketed to "Permasep" ® by E. I. du Pont de Nemours & Company. Reverse osmosis module 52 delivers fresh water via tube 54 to a storage tank or other facility not shown, whereas waste brine is exhausted to the surrounding water via line 55.

Because reverse osmosis module 52 is the most expensive component of the apparatus, it is preferred to house it within reaction unit 22, conveniently installed within protective pipe well 58 supported on transverse spider 58a. The position of the module is, of course, not critical; it could be placed anywhere in the apparatus, on shore, on shipboard, or on the seafloor, for example.

As shown in FIG. 1 particularly, seawater pump 38 is mounted on a cradle 59, the upper plate 60 of which is secured via yoke 61 to pump piston rod 62. Lower plate 63 is attached to the pump cylinder 64 and to connection eye 30a and a multiplicity of circumferentially spaced elastomeric springs 65 in tension, which can conveniently be seawater-resistant rubber shock cords, secure plates 60 and 63 together, thereby constituting external return springs impelling pump piston rod 62 on its down or refill stroke in an essentially inertia-free manner.

The spring constants on elements 65 are preferably in the range of about 500 to 1800 lbs./ft. depending on average wave conditions. Return springs 65 should be preloaded to afford support for the immersed weight of reaction unit 22 when pump piston rod 62 is about one third down in its stroke and to pull wave follower 10 into the water at least in part.

A sand well 70 is preferably utilized to prefilter the seawater before intake to pump 38. This sand well can comprise a polymeric tube with a well screen at the bottom, not shown, jetted into the sand to a depth of 25 to 50 ft., depending on the ambient water quality and sand composition.

Referring to FIG. 7, there is shown an especially preferred embodiment of water-processing system according to this invention wherein seawater is desalinated, which incorporates all of the same components as the system of FIG. 6, denoted by the same reference numerals, except for the addition of a highly advantageous energy recovery system.

Thus, instead of discharging waste brine from reverse osmosis module 52 direct to the sea via exhaust line 55, the brine is returned to the underside of piston 40 in proper timed sequence with the piston rod 62 displacing the volume lost as fresh water through the reverse osmosis module, so that its substantial energy, typically, above 700 lbs./in.$^2$ pressure, aids the pump delivery stroke effort contributed by drive cradle 59.

To accomplish this, waste brine line 55a is directed through conventional fluidic switch 71 and thence via pump boost line 72 opening into the piston rod end of pump 38. Switch 71 derives operative power through signal line 73 connected in shunt from high pressure seawater delivery line 42. The time sequence of fluidic switch 71 is as follows: (1) high pressure during seawater delivery via line 42 is communicated through line 73, thereby opening passage for exhaust seawater flow from reverse osmosis module 52 through line 55a via switch 71 and pump boost line 72 to the rear side of piston 40; (2) upon completion of the pumping stroke, the pressure above piston 40 drops to ambient, as does that in signal line 73, thereby closing the fluidic switch seawater communication with pump 38, simultaneously opening discharge of the backside of piston 40 to the sea via drain line 74.

Referring to FIG. 1, the calm water equilibrium position of wave follower 10 is shown as stabilized at seawater level A, under which (relatively rare) conditions the apparatus will be non-operative. However, when wave action ensues, particularly when the trade winds blow, sustained (practically continuous) medium-to-heavy wave action occurs, as denoted by broken line B, and full pumping power is developed.

In operation, the total depth at the site of deployment is preferably 50–80 feet. Under these circumstances the line between wave follower 10 and reaction unit 22 can be from about 10–50 feet, depending on the total depth of deployment.

For service in trade wind regions, pump 38 preferably has a piston diameter in the range of about 3.8" to 5.5" and a total working bore length of about 60" in reaction unit-comprising assemblies. When direct anchor mooring is employed, the bore length is made longer to accommodate the tidal range. The disclosed dimensions correspond to ratios of wave follower effective waterline plane area (dia. 15') to piston cross sectional area of 2244 and 1071 respectively.

An alternative construction for reaction unit 22 is to employ a monolithic slab of concrete as a substitute for the hollow drum construction hereinbefore described. This alternative design permits utilization of a much more compact form, particularly as regards thickness. Reverse osmosis unit 52 can here conveniently be accommodated horizontally within a protective recess provided in the upper surface of the slab.

The apparatus hereinbefore detailed is capable of producing approximately 1500 gals./day of potable water from full strength seawater at a continuous power consumption of approximately 1.5 kilowatts. Thus, with a wind speed of 16 knots, a fully developed sea will have a 4.5 ft. significant wave height and a statistical mean period of 4.6 sec. Using the method for calculation of wave power given by R. S. Arthur (Scripps Institute of Oceanography, Wave Report #68, 1947), it can be safely assumed that there exists an average wave energy flux of 1.4 kw. per foot of wave crest. Therefore, a desalination system operating at only 12% efficiency for wave energy extraction and at only 60% efficiency for the system hydraulics, with a 15 foot wave frontage, should easily produce 1500 gallons/day of fresh water.

It should be mentioned that the system components, if constructed of seawater-resistant materials, as described, utilizing a reverse osmosis module of the reliability specified, should have a long, trouble-free life in desalination service, excepting, of course, the relatively infrequent hazards of unusually turbulent seas, such as those occasioned by violent storms, extremely high tides and collisions with water craft. Even then, the design is such that sacrificial link 20 will part under potentially destructive forces, saving the structure from ruin and making it possible to restore it to service with a minimum of effort and time loss, providing that a low-cost reserve wave follower 10 can be substituted as replacement (or the original wave follower 10 recaptured and returned to service).

If desired, it is practicable to provide anchoring lines running to the outer edge of the reaction unit if one is used. This prevents excessive rotation of the assembly responsive to changing wind action. With such an anchoring system, apparatus recovery after loss of a wave follower 10 is facilitated.

Finally, it will be understood that the intermittent rate of potable water delivery resulting from varying wind strengths and wave actions has no effect on overall operation, since potable water is stored in tank facilities night and day on an average as-delivered basis, which need not inconvenience users in the slightest.

The foregoing description is directed to a preferred embodiment of this invention; however, it will be understood that relatively wide variations in design are feasible and, depending upon local conditions, even desirable.

Thus, it is practicable to utilize double-acting pumps as substitutes for single-acting designs, provided that the design of associated components is modified accordingly.

Also, the invention can dispense with hydrodynamic reaction unit 22 per se if certain operating limitations are accepted, or if alternate apparatus is substituted for the reaction unit.

The primary purpose of reaction unit 22 is to accommodate operation to tidal changes, storms and unusual oceanic turbulence generally. Total tide swings in near equatorial regions usually range from about 0 to 4 feet, under which conditions loose mooring with hydrodynamic reaction units of the design described is entirely practicable in permitting wave follower 10 to respond to wave movement essentially independent of tidal level.

Another wave of achieving accommodation to tidal changes and storms would be to provide a spring-loaded anchor cable winch, securely anchored to the seafloor, equipped with automatic controls effecting pay out or reel-in of the mooring connection to pump 38, so that there is always maintained an optimum slackness subject to demand.

Also, it is practicable to anchor wave pump 38 directly to the sea floor at deployment sites with relatively small tidal ranges, on the order of 0 to 2 feet, dispensing altogether with any intermediate reaction unit. However, the pump stroke must be increased to accommodate the tidal range; otherwise, there could be periods when the follower is entirely submerged in the water and, thus, severely curtailed in its response to wave movement. Moreover, such an arrangement could subject the mooring to excessive physical stresses, depending on existing conditions.

We have found that the security of the design hereinbefore detailed is quite broadly independent of wave height greater than that required to give maximum performance and the usual periodic variations of tide, weather and the like.

Our studies have confirmed that wave follower 10 should be non-Archimedean. Such a wave follower, when pulled down into the water appreciably (e.g., 12" to 24" for a follower 15' in diameter), effectively becomes part of the ambient ocean or bay, so that the follower responds additionally to orbital movement of the water particles rather than to vertical displacement solely. Wave follower 10 is preloaded by elastomeric return springs 65 which thereupon balance the mass of reaction unit 22, preferably so that piston 40 is at about ⅓ inspiration position. (This arrangement permits use of a reasonable length, i.e., 60" pump, whereas, with direct sea floor mooring, a pump would have to be 60" long with the additional of about one foot in pump length for every foot of tidal range if continuous pumping service is desired.) Other essentially inertia free forces could be used, such as air springs, in place of elastomeric return springs.

In general, a wave follower 10 weighing less than 8,000 lbs, can be utilized with a minimum weight reaction unit 22 weighing about 4,000 lbs. or a maximum weight unit weighing up to about 12,000 lbs.

Such a design functions well at wave periods in the relatively broad range of 3 to about 10 seconds. Surprisingly, the difference in efficiency between a fixed moored design and the design hereinbefore detailed is not more than ±10% absolute.

Desalination per se can be accomplished by reverse osmosis membranes of commercial availability as hereinbefore described; however, this invention is not limited to this specific utility, it being understood that it is broadly operable with comparable pump pressure-actuated processes.

What is claimed is:

1. A wave-powered pumping device useful under trade wind conditions for producing pressures of about 800 psi, said device comprising:
   (a) a non-Archimedean wave follower connected in sequence from top to bottom with (b) a piston pump having a cylinder within which is mounted a reciprocatory piston;

(c) attachment means connecting one of the pair consisting of said cylinder and said reciprocatory piston with said wave follower and the other of said pair with mooring means selected from anchors, alone or in combination with a reaction unit;

wherein the ratio of the wave follower effective waterline plane area to the piston cross sectional area is within the limits of 1000 and 6500.

2. The pumping device of claim 1 wherein the ratio of the wave follower effective waterline plane area to the piston cross sectional area is about 2000.

3. The process of pumping seawater employing a wave-powered pumping device comprising:

(a) a non-Archimedean wave follower connected in sequence from top to bottom with (b) a piston pump having a cylinder within which is mounted a reciprocatory piston;

(c) attachment means connecting one of the pair consisting of said cylinder and said reciprocatory piston with said wave follower and the other of said pair with mooring selected from anchors, alone or in combination with a reaction unit;

wherein the product of the effective waterline plane area and the wave height divided by the product of the piston area and the required pressure is between 50 and 200.

4. The process of claim 3 wherein the product of the effective waterline plane area and the wave height divided by the product of the piston area and the required pressure is about 90.

* * * * *